(12) United States Patent
Hayamizu et al.

(10) Patent No.: US 8,105,728 B2
(45) Date of Patent: Jan. 31, 2012

(54) POLYELECTROLYTE MATERIAL, METHOD FOR PRODUCING POLYELECTROLYTE MATERIAL, POLYELECTROLYTE COMPONENT, FUEL CELL, AND METHOD FOR PRODUCING FUEL CELL

(75) Inventors: Naoya Hayamizu, Kanagawa-ken (JP); Yukihiro Shibata, Fukuoka-ken (JP); Akiko Saito, Kanagawa-ken (JP); Jun Momma, Kanagawa-ken (JP); Hideo Oota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1139 days.

(21) Appl. No.: 11/858,533

(22) Filed: Sep. 20, 2007

(65) Prior Publication Data

US 2008/0233452 A1 Sep. 25, 2008

(30) Foreign Application Priority Data

Mar. 23, 2007 (JP) ................................ 2007-077709

(51) Int. Cl.
*H01M 8/10* (2006.01)
(52) U.S. Cl. ...................................................... 429/494
(58) Field of Classification Search ............ 429/491–494
See application file for complete search history.

(56) References Cited

U.S. PATENT DOCUMENTS

| | | | |
|---|---|---|---|
| 6,632,847 B1* | 10/2003 | Soczka-Guth et al. | 521/27 |
| 2006/0204817 A1* | 9/2006 | Yamaguchi | 429/34 |

FOREIGN PATENT DOCUMENTS

| | | |
|---|---|---|
| CN | 1330566 A | 1/2002 |
| JP | 2006-261103 | 9/2006 |
| WO | 0027513 A2 | 5/2000 |

OTHER PUBLICATIONS

The People's Republic of China Office action for 200810088204X, dated May 22, 2009.

* cited by examiner

*Primary Examiner* — Patrick Ryan
*Assistant Examiner* — Muhammad Siddiquee
(74) *Attorney, Agent, or Firm* — Pearne & Gordon LLP

(57) ABSTRACT

A polyelectrolyte material includes as a main chain: a benzene ring; an ether; and a carbonyl group. A part of the benzene ring is sulfonated. A method for manufacturing a polyelectrolyte material includes: synthesizing disulfonyl difluorobenzophenone; and polymerizing the disulfonyl difluorobenzophenone, 4,4'-difluorobenzophenone, and phenolphthalein with a crown ether as a catalyst. The synthesizing is performed by reacting 4,4'-difluorobenzophenone with fuming sulfuric acid, performing salting-out the reaction product, and recrystallizing the salting-out product.

8 Claims, 5 Drawing Sheets

POLYELECTROLYTE MATERIAL, METHOD FOR PRODUCING POLYELECTROLYTE MATERIAL, POLYELECTROLYTE COMPONENT, FUEL CELL, AND METHOD FOR PRODUCING FUEL CELL

CROSS-REFERENCE TO RELATED APPLICATIONS

This application is based upon and claims the benefit of priority from the prior Japanese Patent Application No. 2007-077709, filed on Mar. 23, 2007; the entire contents of which are incorporated herein by reference.

BACKGROUND OF THE INVENTION

1. Field of the Invention

This invention relates to a polyelectrolyte material, a method for manufacturing a polyelectrolyte material, a polyelectrolyte component, a fuel cell, and a method for manufacturing a fuel cell.

2. Background Art

With the advancement of electronics in recent years, electronic devices have become more downsized, more powerful, and more portable. In particular, downsizing and higher energy density for the cells used therein have become more required. Hence, middle-sized or downsized and lightweight fuel cells having high capacity has been emphasized.

In particular, Direct Methanol Fuel Cell (DMFC) in which methanol serves as the fuel is more suitable for downsizing than a fuel cell using hydrogen gas because there is no difficulty in handling hydrogen gas and a device and such for producing hydrogen by modifying a liquid fuel is not required. In the direct methanol fuel cell, methanol and water are supplied to fuel electrode side (anode electrode side), and methanol and water are reacted by a catalyst in the vicinity of a polyelectrolyte membrane to take out proton ($H^+$) and electron ($e^-$).

A widely used polyelectrolyte as a binder for such a polyelectrolyte membrane or a catalyst includes Nafion (registered trademark, DuPont Inc.). However, Nafion (registered trademark) has large thermal expansion or large expansion due to moisture and therefore has been in danger of causing "methanol crossover", and has been also in danger of causing dissolution if continuing to contact a liquid fuel of high concentration (for example, methanol).

Accordingly, a polyelectrolyte material that can suppress methanol crossover and that is also chemically stable has been proposed (see, Japanese Patent Application Laid-Open JP-A 2006-261103(Kokai)).

However, such a polyelectrolyte material as disclosed in Japanese Patent Application Laid-Open JP-A 2006-261103 (Kokai) requires introduction of a protective group for production thereof, and therefore, there has been danger that the production process gets complex and therefore the cost reduction cannot be achieved.

SUMMARY OF THE INVENTION

According to an aspect of the invention, there is provided a polyelectrolyte material including as a main chain: a benzene ring; an ether; and a carbonyl group, a part of the benzene ring being sulfonated.

According to another aspect of the invention, there is provided a method for manufacturing a polyelectrolyte material including: synthesizing disulfonyl difluorobenzophenone by reacting 4,4'-difluorobenzophenone with fuming sulfuric acid, performing salting-out the reaction product, and recrystallizing the salting-out product; and polymerizing the disulfonyl difluorobenzophenone, 4,4'-difluorobenzophenone, and phenolphthalein with a crown ether as a catalyst.

According to another aspect of the invention, there is provided a polyelectrolyte component including a polyelectrolyte material, the polyelectrolyte material including as a main chain; a benzene ring; an ether; and a carbonyl group, a part of the benzene ring being sulfonated.

According to another aspect of the invention, there is provided a fuel cell including: a fuel electrode to which a liquid fuel is supplied; an air electrode to which an oxidant is supplied; and a polyelectrolyte membrane provided between the fuel electrode and the air electrode, the polyelectrolyte membrane including a polyelectrolyte material, the polyelectrolyte material including as a main chain; a benzene ring; an ether; and a carbonyl group, a part of the benzene ring being sulfonated.

According to another aspect of the invention, there is provided a method for manufacturing a fuel cell including, a fuel electrode to which a liquid fuel is supplied, an air electrode to which an oxidant is supplied, and a polyelectrolyte membrane provided between the fuel electrode and the air electrode, the method including: forming the polyelectrolyte membrane by using a solution containing the polyelectrolyte material having as a main chain; a benzene ring; an ether; and a carbonyl group, a part of the benzene ring being sulfonated.

DETAILED DESCRIPTION OF THE INVENTION

A polyelectrolyte material having higher mechanical strength, higher chemical stability, and higher proton conductivity than those of a perfluorosulfonic acid-based polymer as represented by Nafion (registered trademark) is required. Here, it is found that a polyelectrolyte material of a sulfonate of an aromatic polyetherketone is preferable when a polymer bone of a polyelectrolyte material is studied from the view points of mechanical strength, heat resistance, chemical stability, and so forth.

However, in a sulfonate of an aromatic polyetherketone, there is a problem that the sulfonate has high crystallinity and therefore becomes insoluble in a solvent and processing thereof becomes very difficult. Therefore, as disclosed in the Japanese Patent Application Laid-Open JP-A 2006-261103 (Kokai), there has been proposed a technique that by introducing a protective group in the polymer, the crystallinity of the sulfonate of an aromatic polyetherketone is reduced to provide solubility and thereby to make it possible to process the sulfonate.

Here, the protective group is a substituent that is temporally introduced on the premise of being removed in a post-process and that can inactivate the highly reactive functional group by the introduction and that can be removed in the post-process to restore the original highly-reactive functional group.

Therefore, in such a technique, the introduction and the removal of the protective group are inevitably required and there has been danger of causing new problems that the production process gets complex and that the product price increases.

As a result of the study, the present inventors have obtained knowledge that a polymerization reaction suppressing and causing no crosslink of a carbonyl group reacting with another polymer can be realized by not only using general heating but also using a crown ether as the catalyst. Therefore, by using such a method, a protective group is not required to be introduced, and the polyelectrolyte material can be directly obtained.

Hereinafter, based on the knowledge obtained by the present inventors, the polyelectrolyte material and the method for manufacturing the same will be explained.

Figure 1:
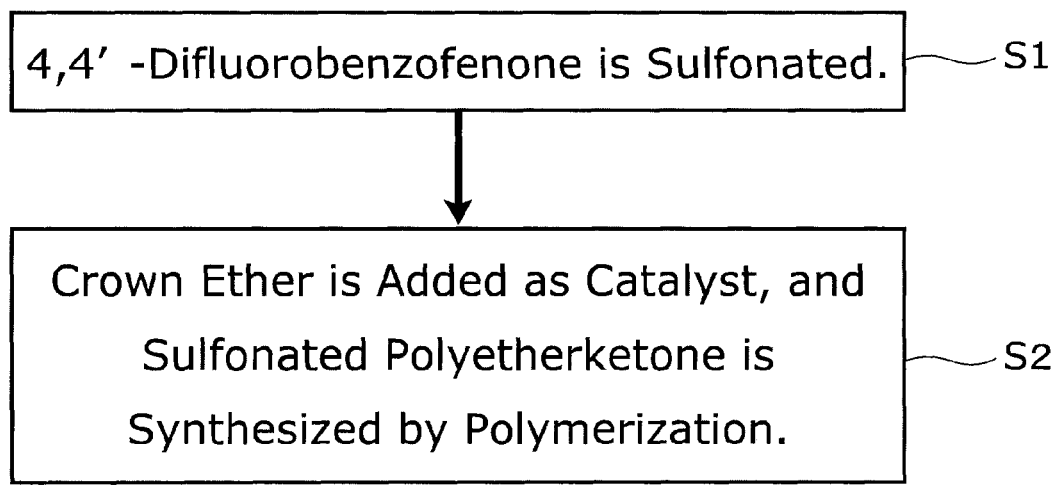
FIG. 1 is a flow chart for a method for manufacturing a polyelectrolyte material according to an embodiment of the present invention.

FIG. 1 is a flow chart for explaining a method for manufacturing a polyelectrolyte material according to an embodiment of the present invention.

As shown in FIG. 1, first, 4,4'-difluorobenzophenone is sulfonated to synthesize disulfonyl difluorobenzophenone (Step S1).

Specifically, first, as shown in Chemical Formula 2, a predetermined amount of 4,4'-difluorobenzophenone is immersed in an oil bath under a nitrogen atmosphere at 160° C. to melt monomer, and then the set temperature of the oil bath is lowered to 120° C. and a predetermined amount of 30% fuming sulfuric acid is added. Here, the compounding ratio can be, for example, approximately 270 milliliters (1.91 mol as $SO_3$) of the 30% fuming sulfuric acid with respect to 100 gram (0.476 mol) of 4,4'-difluorobenzophenone.

(Chemical Formula 2)

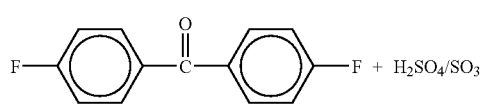

Next, the product is cooled to room temperature and put into saturated salt water and salted out. The rough sulfonate obtained as described above is repeatedly subjected at some times to recrystallization by 2-propanol/water=70/30 (% by weight) and then dried in a vacuum to synthesize disulfonyl difluorobenzophenone as shown in the following structural formula (Chemical formula 3), and thereby, the sulfonation of 4,4'-difluorobenzophenone is finished.

(Chemical Formula 3)

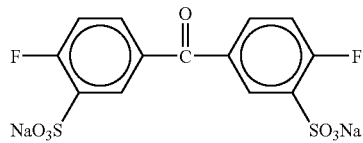

Next, sulfonated polyetherketone is synthesized by polymerization (Step S2).

Specifically, first, as shown in the following Structural Formula (Chemical Formula 4), the above-described sulfonated 4,4'-difluorobenzophenone (disulfonyl difluorobenzophenone), the untreated 4,4'-difluorobenzophenone, phenolphthalein, potassium carbonate, and a solvent (dimethyl acetamide, toluene) are stirred at room temperature with introducing nitrogen thereto, and then, refluxed with being immersed and stirred in the oil bath at 150° C. In addition, the potassium carbonate functions as a polycondensation catalyst.

Here, it is preferable that a sulfonation rate in a structural portion of benzophenone in the sulfonated 4,4'-difluorobenzophenone (disulfonyl difluorobenzophenone) is from 0.3 to 0.8.

If less than 0.3, the resistance is high because the proton conductivity is low, and if more than 0.8, the disulfonyl difluorobenzophenone cannot function as a solid electrolyte in water system. In this case, the sulfonation rate can be controlled by the compounding proportion of the sulfonated 4,4'-difluorobenzophenone (disulfonyl difluorobenzophenone) and the untreated 4,4'-difluorobenzophenon.

(Chemical Formula 4)

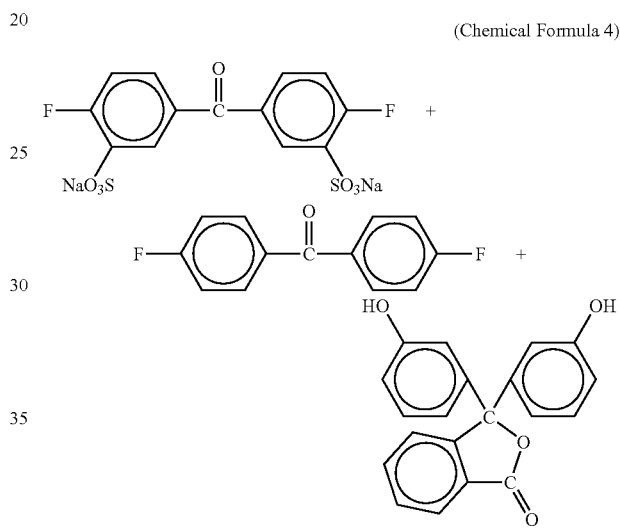

Then, the temperature is set back to room temperature, a crown ether (for example, 18-crown-6) is added as the catalyst, and the product is immersed in an oil bath at 160° C. again. Then, furthermore, a crown ether (for example, 18-crown-6) is added thereto, and the reaction is performed in the oil bath at 160° C., and thereby, a sulfonated polyetherketone containing a unit of the following structural formula (Chemical Formula 5) as a structural unit is obtained. In this case, by adding the crown ether there to again and heating the product, it becomes possible to increase the molecular weight thereof. In addition, it is also possible that after this, the sulfonate obtained as described above is precipitated in acetone again, and then, rinsed with pure water and dried in a vacuum.

(Chemical Formula 5)

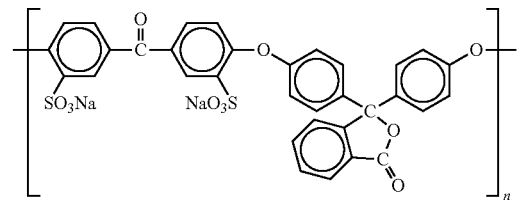

Here, by exemplify a molar equivalent of the compounding rate, it can be set that the sulfonated 4,4'-difluorobenzophenone (disulfonyl difluorobenzophenone): the untreated 4,4'-difluorobenzophenone:phenolphthalein:potassium carbonate:18-crown-6=0.5:0.5~1:1:4:0.1~1. The amount of the solvent (dimethylacetamide, toluene) can be appropriately modified.

18-crown-6 as exemplified as the crown ether can be replaced by, for example, 12-crown-4,15-crown-5, or the like.

The sulfonated polyetherketone obtained as described above can be dissolved in a solvent such as N—N-dimethyl formamide and N-methylpyrolidone, and therefore, it becomes possible that the subsequent coating, processing into membrane or particle, and so forth are easy to be performed. As a result, it is not necessary to perform introduction and removal of a protective group in such a technique as disclosed in the Japanese Patent Application Laid-Open JP-A 2006-261103(Kokai), and the sulfonated polyetherketone that is easy to be process can be obtained, and therefore, the production process can be simplified.

Moreover, the sulfonated polyetherketone obtained as described above has high mechanical strength, and therefore, thermal expansion and expansion due to moisture can be suppressed.

In the sulfonated polyetherketone obtained as described above, thermal expansion and expansion due to moisture can be drastically suppressed, compared to, for example, Nafion (registered trademark). Moreover, the dissolution with respect to methanol can be drastically suppressed. Therefore, methanol crossover can be drastically suppressed.

Moreover, because the mechanical strength can be improved at approximately 80% more than that of Nafion (registered trademark), the polyelectrolyte membrane of the fuel cell to be described later can be thinned at approximately 50 micrometers. As a result, the conductivity of proton ($H^+$) can be improved at approximately 60%, and the power generation efficiency of the fuel cell can also be drastically improved.

Moreover, the product as described above is according to the case of synthesizing sulfonated polyetherketone. However, also another polyelectrolyte material having higher mechanical strength and higher chemical stability and higher proton conductivity than those of a perfluorosulfonic acid-based polymer can be synthesized by polymerization reaction using a crown ether as the catalyst without requiring the introduction of a protective group. Such a polyelectrolyte material may be a polymer containing a benzene ring, an ether, and a carbonyl group as the main chain in which a part of the benzene ring is sulfonated.

Next, a polyelectrolyte component using the polyelectrolyte material obtained as described above will be explained.

A polyelectrolyte component according to an embodiment of the present invention includes a polyelectrolyte membrane of a fuel cell.

Figure 2:
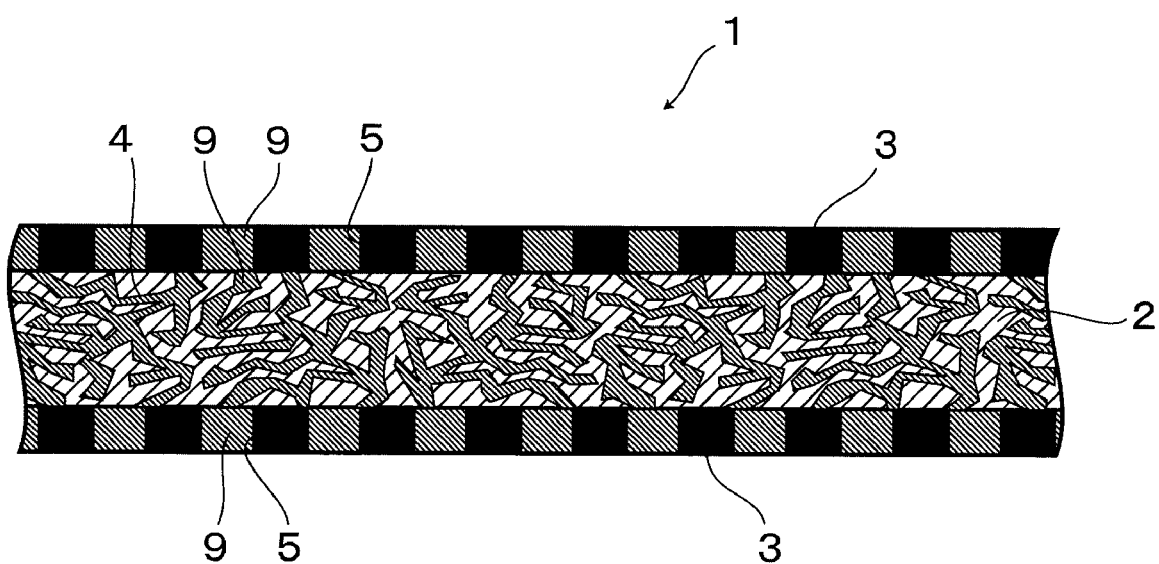
FIG. 2 is a cross-sectional view illustrating a polyelectrolyte membrane of a fuel cell according to an embodiment of the present invention.

FIG. 2 is a cross-sectional view illustrating a polyelectrolyte membrane of a fuel cell as exemplifying a polyelectrolyte component according to an embodiment of the present invention.

As shown in FIG. 2, a polyelectrolyte membrane 1 has a poromeric material layer 2 and inorganic material layers 3 formed on both sides of main surfaces thereof. The poromeric material layer 2 is provided with labyrinthine through-holes 4 and the inorganic material layer 3 is provided with openings 5. Moreover, the through-holes 4 and the openings 5 are filled with a polyelectrolyte material 9 according to the present embodiment. The inorganic material layer 3 is not necessarily required and it is possible that only the poromeric material layer 2 exists.

The poromeric material layer 2 filled with the polyelectrolyte material 9 has a function of suppressing permeability of liquid fuel (for example, methanol) with achieving conduction of proton ($H^+$). The reason why the through-holes 4 are set to be labyrinthine is that the function of suppressing permeability of liquid fuel is emphasized. The reason why the holes provided in the inorganic material layer 3 are set to be openings 5 (straight holes) is that the conductivity of proton ($H^+$) is emphasized and if the holes are set to be labyrinthine in the same manner as the through-holes 4, a problem is caused in the conductivity of proton ($H^+$) as the entirety of the polyelectrolyte membrane 1.

The poromeric material layer 2 can be composed of an organic material, an inorganic material, or complex material which has heat resistance.

For example, the organic material includes polyethylene, polypropylene, polyimide, polyamide, polyetherimide, polyetheretherketone, polytetrafluoroethylene, tetrafluoroethylene-ethylene copolymer, tetrafluoroethylene-propylene copolymer, tetrafluoroethylene-hexafluoropropylene copolymer, polyvinylidenefluoride, tetrafluoroethylene-perfluoroalkoxyethylene copolymer, polysulfone, polyphenylenesulfide, polyallylate, polyethersulfone, and polysilazane. The inorganic material includes silicon oxide, silicon carbide, silicon nitride, alumina, zirconium oxide, ceria, lead oxide, bismuth oxide, and boron oxide. The complex material includes polypropylene in which a glass fiber or an organic fiber is complexly mixed.

However, it is more preferable that the poromeric material layer 2 is composed of the organic material or the complex material. The organic material or the complex material can form thinner polyelectrolyte membrane 1 and is advantageous to conduction of proton ($H^+$). Moreover, the organic material or the complex material is rich in flexibility, and strong for damage such as break or crack and suitable for being downsized.

As the method for providing labyrinthine through-holes 4 in the material, known chemical or physical methods such as phase separation method, foaming method, and sol-gel method can be used.

The inorganic material layer 3 can be composed of an inorganic material having heat resistance. In particular, the material includes silicon, silicon oxide, silicon nitride, aluminum oxide, boron oxide, bismuth oxide, barium oxide, zinc oxide, magnesium oxide, calcium oxide, strontium oxide, lithium oxide, sodium oxide, and potassium oxide. The method for providing the openings 5 in the material will be described later.

For the polyelectrolyte material 9 filled in the through-holes 4 and the openings 5, there can be used the above-described polymer containing a benzene ring, an ether, and a carbonyl group as a main chain in which a part of the benzene ring is sulfonated. In particular, sulfonated polyetherketone and such can be used. The method for filling the material in the through-holes 4 and the openings 5 will be described later.

Next, the permeability of liquid fuel in the poromeric material layer 2 and such (for example, methanol crossover) will be explained.

If an aqueous solution of liquid fuel (for example, methanol) that is a fuel of a fuel cell continues to be in contact with the poromeric material layer 2 or the inorganic material layer 3, the liquid fuel permeates the poromeric material layer 2 or the inorganic material layer 3 and expansion of the filled electrolyte material is caused. And, if such expansion is caused, permeation of the liquid fuel (for example, methanol crossover) is caused. It is thought that this is because the through-holes 4 in the poromeric material layer 2 or the openings 5 in the inorganic material layer 3 cause size change (pressed and expanded) by the expansion.

If the permeation of the liquid fuel (for example, methanol crossover) is caused, the liquid fuel (for example, methanol) reaches the side of the air electrode (cathode electrode), the liquid fuel (for example, methanol) that is the fuel becomes consumed without generating proton ($H^+$) or electron ($e^-$). Furthermore, the catalyst such as platinum (Pt) in the side of the air electrode (cathode electrode) is harmed and the catalyst activity is also lowered and the power-generating efficiency is significantly lowered.

Moreover, when the fuel cell is not used, the polyelectrolyte membrane 1 is dried and contracted. In addition, for enhancing the activity of the catalyst to enhance the power-generating efficiency, the operation temperature of the fuel cell is tend to be enhanced, and expansion and contraction due to temperature change also has been enhanced. As a result, by the stress due to such expansion and contraction, there is also danger of causing trouble such as delamination of the catalyst layer from the polyelectrolyte membrane 1.

The polyelectrolyte material 9 according to the present embodiment can suppress the thermal expansion or the expansion of permeation of water contained in the liquid fuel as described above. Therefore, in the case of using the polyelectrolyte material 9 according to the present embodiment, the size change of poromeric material layer 2 or the inorganic material layer 3 can be prevented to suppress the permeation of the liquid fuel (for example, methanol crossover) and so forth.

Moreover, the mechanical strength is high and therefore the polyelectrolyte membrane 1 can be thin and the conduction of proton ($H^+$) becomes easy.

Moreover, in fuel cells in recent years, it is desired to use liquid fuel of high concentration (such as, 50% by weight or more of methanol). In this case, if Nafion (registered trademark) is used as the electrolyte, the filled electrolyte material is in danger of being melted. With respect to this point, when the polyelectrolyte material 9 according to the present embodiment, the dissolution due to the liquid fuel of high concentration (such as, 50% by weight or more of methanol) can be suppressed and it becomes possible to correspond to liquid fuel of high concentration.

As explained above, according to the present embodiment, it is possible to achieve high membrane strength and permeation of the liquid fuel (for example, methanol crossover), a polyelectrolyte membrane being capable of corresponding to liquid fuel of high concentration can be obtained.

Next, the method for manufacturing a polyelectrolyte membrane according to an embodiment of the present invention will be explained.

Figure 3:
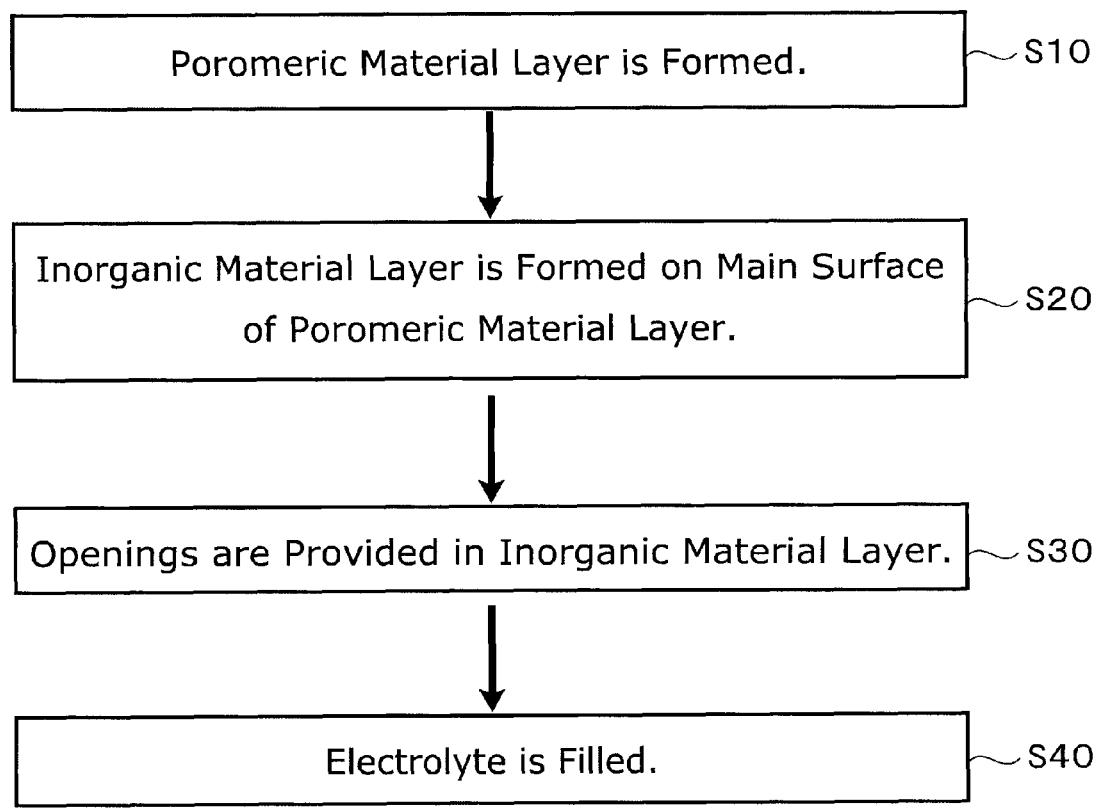
FIG. 3 is a flow chart for the method for manufacturing a polyelectrolyte membrane according to an embodiment of the present invention.

FIG. 3 is a flow chart for the method for manufacturing a polyelectrolyte membrane according to the present embodiment.

First, the poromeric material layer 2 is formed by using a chemical or physical method such as phase separation method, foaming method, sol-gel method, or the like (Step S10).

In addition, for the poromeric material layer 2, commercially available poromeric material is appropriately used. In this case, Step S10 is not required. For example, polyimide poromeric membrane (UBILEX PT manufactured by UBE INDUSTRIES, LTD) with a thickness of 25 micrometers and an opening rate of 25% and so forth can be used.

Next, the inorganic material layers 3 are formed on main surfaces of the poromeric material layer 2 (Step S20).

For example, silicon dioxide ($SiO_2$) film is formed with a thickness of approximately 0.5 micrometers on the above-described polyimide poromeric membrane. As the film-forming method, physical deposition method represented by spattering method or a chemical film-method represented by CVD (Chemical Vapor Deposition) can be used. For example, RF spattering method is used as the method for film-forming of silicon dioxide ($SiO_2$), and as the condition of film-forming, silicon dioxide ($SiO_2$) can be used for the target, and the pressure can be approximately 1 Pa, RF power can be approximately 400 watt, the Ar gas can be used as the spattering gas with a flow rate of approximately 30 sccm, and the poromeric material layer temperature can be approximately 40° C.

It is preferable that the inorganic material layer 3 is formed so as to be firmly attached to the poromeric material layer 2. This is because if the contact in the interface between the poromeric material layer 2 and the inorganic material layer 3 is bad, the conductivity of proton ($H^+$) is lowered and the lowering of power-generating efficiency is caused.

Therefore, for enhancing the contact between the poromeric material layer 2 and the inorganic material layer 3, it is preferable to perform surface reforming treatment of the poromeric material layer 2. For example, in such a case that the poromeric material layer 2 is composed of an organic material and oxide such as silicon oxide ($SiO_2$) is selected as the inorganic material layer 3, it is preferable that the surfaces of the poromeric material layer 2 is made to be hydrophilic. The reforming treatment method in the case includes surface reforming method by irradiation of ultraviolet light by excimer lamp and such. In particular, the vacuum ultraviolet light with a wavelength of 172 nanometers generated by excimer lamp has strong photon energy and can irradiate a wide area and therefore enhance the efficiency of reforming treatment.

Next, the openings 5 are provided in the inorganic material layer 3 (Step S30). As the method for providing the openings 5, dry etching method, wet etching method, or the like can be used. Here, the case of using wet etching method is exemplified. First, ultraviolet cure resin is spin-coated at approximately several tens of micrometers on the inorganic material layer 3, and thereby the pattern of the openings 5 is formed through baking, exposure, development, and post-baking. Then, etching is performed with buffered hydrofluoric acid, and the resist is removed by using a removing solution, and thereby, desired openings 5 can be provided on the inorganic material layer 3.

Next, in the through-holes 4 of the poromeric material layer 2 and the openings 5 of the inorganic material layer 3, the polyelectrolyte material 9 according to the present embodiment is filled to obtain the desired polyelectrolyte membrane (Step S40).

The method for filling the polyelectrolyte material 9 includes a method for immersing the poromeric material layer 3 and the inorganic material layer 3 in an electrolyte solution and pull out and drying the layers and thereby removing the solvent. In this time, the immersion and drying are repeated at some times. As the solvent of the electrolyte solution, water and surfactant, organic solvent, mixed solution thereof, or the like is used, but the solvent is required to be capable of dissolve the polyelectrolyte material 9 or to stably disperse the material.

As described above, the polyelectrolyte material 9 according to the present embodiment is sulfonated polyetherketone, which is generally difficult to be dissolved, but can be dissolved in a solvent such as N—N-dimethylformamide, N-methylpyrolidone, or the like. Therefore, processing thereof can be performed by a simple method of filling the material by immersing the material in the electrolyte solution.

For convenience of the explanation, the polyelectrolyte membrane 1 has been explained as the membrane in which the polyelectrolyte material 9 is filled in the through-holes 4 of the poromeric material layer 2 or the openings 5 of the inorganic material layer 3, but may be the membrane composed of the polyelectrolyte material. In this case, the above-described sulfonated polyetherketone dissolved in N—N-dimethyl formamide or the like may be processed to be a membrane of approximately 50 micrometers by a casting method.

In addition, the polyelectrolyte component includes a binder of a catalyst of a fuel cell. In such a case, the material can be dissolved in a solvent such as N—N-dimethyl formamide, N-methylpyrolidone, or the like, and therefore, by such a method that the solution of the polyelectrolyte material is mixed in a catalyst, the material can be easily to be a binder.

The polyelectrolyte material according to the present embodiment is not limited to the use applications, but can be applied to fields such as production of water electrolysis, production of electrolyzed ionic water or functional water or the like, sterilization by electrolyzation, soda electrolysis, and so forth.

Next, the fuel cell using the polyelectrolyte material according to an embodiment of the present invention will be explained.

Figure 4:
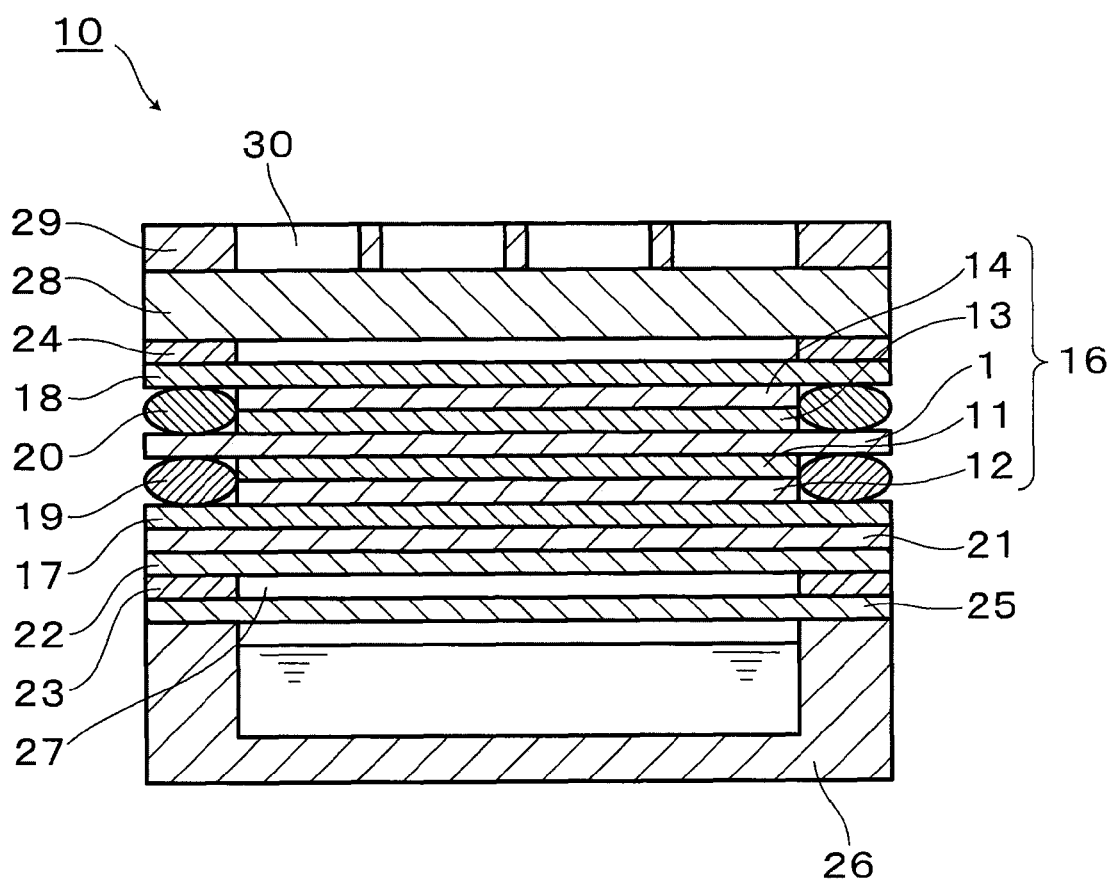
FIG. 4 is a cross-sectional view illustrating a fuel cell according to an embodiment of the present invention.

FIG. 4 is a cross-sectional view illustrating a fuel cell according to the present embodiment.

For convenience of the explanation, Direct Methanol Fuel Cell (DMFC) in which methanol serves as the fuel will be explained.

As shown in FIG. 4, the fuel cell 10 has, as an electromotive part, Membrane Electrode Assembly (MEA) 16 having a fuel electrode composed of a fuel electrode catalyst layer 11 and a fuel electrode gas diffusion layer 12; an air electrode composed of air electrode catalyst layer 13 and air electrode gas diffusion layer 14; and the polyelectrolyte membrane 1 according to the present embodiment sandwiched between the fuel electrode catalyst layer 11 and the air electrode catalyst layer 13.

The catalysts contained in the fuel electrode catalyst layer 11 and the air electrode catalyst layer 13 includes simple substance metals such as Pt, Ru, Rh, Ir, Os, and Pd, which are platinoid elements, and an alloy containing a platinoid element. In particular, as the catalyst contained in the fuel electrode catalyst layer 11, Pt—Ru, Pt—Mo, or the like, having strong resistance to methanol or carbon monoxide can be used. Moreover, as the catalyst contained in the air electrode catalyst layer 13, platinum, Pt—Ni, or the like can be used. Moreover, a supported catalyst using a conductive supporting body such as a carbon material or non-supported catalyst may be used. However, the catalyst is not limited thereto and can be appropriately changed.

As described above, as the binder for binding them, there can be used a polymer containing a benzene ring, an ether, and a carbonyl group as the main chain in which a part of the benzene ring is sulfonated. In particular, for example, the above-described sulfonated polyetherketone can be used.

For the polyelectrolyte membrane 1, similarly, there can be used a polymer containing a benzene ring, an ether, and a carbonyl group as the main chain in which a part of the benzene ring is sulfonated. In particular, for example, the above-described sulfonated polyetherketone can be used. In this case, the polyelectrolyte membrane 1 may be a membrane in which the polyelectrolyte material according to the present embodiment is filled in the through-holes of the poromeric material layer or the openings of the inorganic material layers, but may be a membrane composed of a polyelectrolyte material.

The fuel electrode gas diffusion layer 12 provided so as to be laminated on the fuel electrode catalyst layer 11 plays a roll of supplying a fuel uniformly in the fuel electrode catalyst layer 11 and therewith functions as a collector of the fuel electrode catalyst layer 11.

On the other hand, the air electrode gas diffusion layer 14 laminated on the air electrode catalyst layer 13 plays a roll of supplying an oxidant uniformly in the air electrode catalyst layer 13 and therewith functions as a collector of the air electrode catalyst layer 13.

And, on the fuel electrode gas diffusion layer 12, a fuel electrode conductive layer 17 is provided so as to be laminated, and on the air electrode gas diffusion layer 14, an air electrode conductive layer 18 is provided so as to be laminated. The fuel electrode conductive layer 17 and the air electrode conductive layer 18 are composed of poromeric layers such as a mesh composed of conductive metal material such as gold.

Between the polyelectrolyte membrane 1 and the fuel electrode conductive layer 17 and between the polyelectrolyte membrane 1 and the air electrode conductive layer 18, rubber O-rings 19, 20 are provided and fuel leakage and oxidant leakage from the membrane electrode assembly 16 are prevented.

Moreover, over the fuel electrode conductive layer 17, hydrophobic poromeric membrane 21 and a polymer swelling membrane 22 are provided so as to be laminated in the order. And, by frames 23, 24 (here, rectangular frames) constructed with a shape corresponding to the outer shape of the fuel cell 10, the laminated body including the polymer swelling membrane 22 and air electrode conductive layer 18 and layers therebetween are sandwiched. The frames 23, 24 are formed with a thermoplastic polyester resin such as polyethyleneterephthalate (PET).

Moreover, the flame 23 in the fuel electrode side is connected to a liquid fuel tank 26 functioning as a fuel supply part, through gas-liquid separation membrane 25 functioning as a gas-phase fuel permeating membrane that can permeate only a vaporized component of the liquid fuel and cannot permeate the liquid fuel.

The gas-liquid separation membrane 25 is disposed so as to block the opening provided for introducing the vaporized component of the liquid fuel in the liquid fuel tank 26. The gas-liquid separation membrane 25 separates the vaporized component of the fuel from the liquid fuel and can be composed of a material such as silicone rubber.

Moreover, in the side of the liquid fuel tank 26 of the gas-liquid separation membrane 25, a permeation amount control membrane for controlling a permeation amount of the vaporized component of the fuel (not shown) may be provided. The control of the permeation amount of the vaporized component by the permeation amount control membrane is performed by modifying the opening rate of the permeation amount control membrane. The permeation amount control membrane can be composed of a material such as polyethyleneterephthalate. By providing the permeation amount control membrane, the gas-liquid separation of the fuel is enabled, and therewith, the supplied amount of the vaporized component of the fuel supplied to the side of the fuel electrode catalyst layer 11.

Here, the liquid fuel stored in the liquid fuel tank 26 can be methanol whose concentration is more than 50 mol % or pure methanol. In this case, pure degree of the pure methanol can be from 95% by weight to 100% by weight. Moreover, when liquid ethanol is used as the liquid fuel, the vaporized component of the liquid fuel means a vaporized ethanol, and when methanol aqueous solution is used as the liquid fuel, the component means a mixed gas composed of a vaporized component of methanol and a vaporized component of water.

The poromeric membrane 21 has hydrophobicity and prevents water from invading the side of the polymer swelling membrane 22 from the side of the fuel electrode gas diffusion layer 12 through the poromeric membrane 21, and on the other hand, enables permeation of the vaporized component of methanol from the side of the polymer swelling membrane 22 to the side of fuel electrode gas diffusion layer 12 through the poromeric membrane 21. As the material of the poromeric membrane 21, polytetrafluoroethylene (PTFE) or silicone sheet that is water-repellent treated or the like can be used.

By disposing the poromeric membrane 21 between the fuel electrode conductive layer 17 and the polymer swelling membrane 22, for example, in such as case that water generated in the air electrode catalyst layer 13 passes through the polyelectrolyte membrane 1 and moves to the side of the fuel electrode catalyst layer 11 by a osmotic pressure phenomenon, the moving water can be prevented from invading the side of the polymer swelling membrane 22 or the gas-liquid separation membrane 25 therebelow. Thereby, for example, in a vaporized fuel holding chamber 27 and such, decrease of space by filling water therein is not caused, and therefore, the vaporization of the fuel in the liquid fuel tank 26 can be advanced without being prevented. Moreover, by holding water between the fuel electrode catalyst layer 11 and the poromeric membrane 21, water in the fuel electrode catalyst layer 11 can be supplemented and is effective in the case that moisture is not supplied from the liquid fuel tank 26 by using the fuel of pure methanol. The transfer of water from the side of the air electrode catalyst layer 13 to the side of the fuel electrode catalyst layer 11 by an osmotic pressure phenomenon can be controlled by modifying number or size of air inlets 30 in a surface layer 29 provided on a moisturizing layer 28 to adjust the opening area and such.

The polymer swelling membrane 22 functions as a fuel concentration adjusting layer for adjusting concentration or supplied amount or the like of the fuel supplied to the fuel electrode catalyst layer 11, and absorbs gas-phase methanol vaporized in the liquid fuel tank 26 and passing through the gas-liquid separation membrane 25, to the limited concentration of the absorption namely the saturated concentration, and thereby methanol over the saturated concentration is supplied to the side of the fuel electrode catalyst layer 11. As the material composing the polymer swelling membrane 22, for example, cellulose-based, acrylic, or vinyl polymer can be used. In particular, the cellulose based polymer includes methyl cellulose, and the acrylic polymer includes polybutylmethacrylate, and the vinyl polymer includes polyvinylbutyrate.

Here, the polymer material forming the polymer swelling membrane 22 has functional groups such as OH group, carboxyl group, and sulfone group, and therefore, has interaction with methanol, and the released amount of methanol from the polymer swelling membrane 22 is difficult to be affected by external temperature and such. Therefore, without depending on external temperature and such, methanol of approximately constant concentration can be supplied to the side of the fuel electrode catalyst layer 11. In addition, the saturation concentration of methanol in the polymer swelling membrane 22 can be adjusted by, for example, thickness and such of polymer swelling membrane 22 although being different with depending on functional groups and such of the polymer forming the polymer swelling membrane 22.

Furthermore, the polymer swelling membrane 22 can reversibly change the state thereof from a non-gel membrane state to a gel membrane state along with temperature change in a predetermined range. For example, in the case of using methylcellulose as the polymer swelling membrane 22, when the temperature rises to approximately 50-70° C., the polymer layer turns into a gel by thermal gelatinization effect. The thermal gelatinization effect has reversibility with respect to temperature, and therefore, when the temperature returns to normal temperature, the gelatinization is solved and the layer goes back to the original polymer membrane. Thereby, for example, in the liquid fuel tank 26, even in the state that vaporization of methanol is promoted and thereby the temperature becomes an activation temperature in which methanol supply becomes too much (for example, approximately 50-70° C.), the polymer swelling membrane 22 turns into a gel, and therefore, the diffusion rate of methanol to the side of the fuel electrode catalyst layer 11 is lowered to be capable of preventing the too much supply. On the other hand, when the temperature falls to normal temperature, the layer goes back to the original polymer membrane, and therefore, in normal temperature in which the supply of methanol does not become too much, the diffusion rate of methanol to the side of the fuel electrode catalyst layer 11 can be made to be the original state. Thereby, it can be avoided to supply a large amount of the vaporized fuel to the fuel electrode catalyst layer 11 at one time, and generation of methanol crossover can be suppressed. Moreover, without depending external temperature and such, methanol of approximately constant concentration can be supplied to the side of fuel electrode catalyst layer 11.

Moreover, the space surrounded by the frame 23 between the polymer swelling membrane 22 and gel-liquid separation membrane 25 temporally contains the vaporized fuel diffusing through the gas-liquid separation membrane 25, and further, is the vaporized fuel holding chamber 27 for uniforming concentration distribution of the vaporized fuel. In addition, it is preferable that the vaporized fuel holding chamber 27 is formed for temporally containing the vaporized fuel diffusing through the gas-liquid separation membrane 25 and further for uniforming concentration distribution of the vaporized fuel. However, the fuel cell 10 may be composed without forming the vaporized fuel holding chamber 27.

Here, for preventing delamination or drop of the polymer swelling membrane 22, a poromeric membrane (not shown) may be disposed between the polymer swelling membrane 22 and the gas-liquid separation membrane 25. It is preferable that the poromeric membrane is disposed so as to contact the surface of the side of the liquid fuel tank 26 of the polymer swelling membrane 22. The poromeric membrane is composed of a material such as PTFE (polytetrafluoroethylene), and a film whose maximum opening diameter is approximately 10-100 micrometers. The reason why the maximum opening diameter is set to be in this range is that when the opening diameter is smaller than 10 micrometers, the permeation rate of methanol is too low, and when larger than 100 micrometers, liquid methanol comes to pass therethrough.

On the other hand, on the flame 24 in the air electrode side, the moisturizing layer 28 is laminated, and on the moisturizing layer 28, the surface layer 29 in which a plurality of air inlets 30 for taking in air that is an oxidant is provided so as to be laminated. The surface layer 29 plays a role of enhancing the adhesion with pressing the laminated body including the membrane electrode assembly 16, and therefore, is composed of a metal such as SUS304. The moisturizing layer 28 plays a roll of impregnating some of water generated in the air electrode catalyst layer 13 to suppress transpiration of water, and therewith, functions as an auxiliary diffusion layer for promoting uniform diffusion of the oxidant to the air electrode catalyst layer 13 by uniformly introducing the oxidant into the air electrode gas diffusion layer 14.

The moisturizing layer 28 is composed of a material such as polyethylene poromeric membrane, and a membrane whose maximum opening diameter is approximately 20-50 micrometers is used. The reason why the maximum opening diameter is set to be in this range is that when the opening diameter is smaller than 20 micrometers, the air permeability lowers, and when larger than 50 micrometers, the moisture vaporization becomes too much. It is preferable that the moisturizing layer 28 is provided, but the fuel cell 10 can be composed without using the moisturizing layer 28. In the case, it is preferable that the surface layer 29 is provided on the flame 24 in the air electrode side, and thereby, the moisture storage amount or the water transpiration amount in the air electrode catalyst layer 13 is adjusted. However, the fuel cell 10 can also be composed without using the surface layer 29.

Next, the action of the above-described fuel cell 10 will be explained.

The methanol aqueous solution (liquid fuel) in the liquid fuel tank 26 is vaporized, and the mixed gas of the vaporized methanol and the water vapor permeates the gas-liquid separation membrane 25 and is once contained in the vaporized fuel holding chamber 27, and the concentration distribution is uniformed. The mixed gas that once contained in the vaporized fuel holding chamber 27 invades the polymer swelling membrane 22, and here, methanol is absorbed in the polymer swelling membrane 22. And, when the polymer swelling membrane 22 reached a saturation state, methanol is released from the polymer swelling membrane 22, and passes through the poromeric membrane 21 and the fuel electrode conductive layer 17 with water vapor, and diffused in the fuel electrode gas diffusion layer 12, and supplied to the fuel electrode catalyst layer 11. The mixed gas supplied to the fuel electrode catalyst layer 11 causes internal reforming reaction of methanol as shown in the following formula (1).

$$CH_3OH + H_2O \rightarrow CO_2 + 6H^+ + 6e^- \qquad (1)$$

When pure methanol is used as the liquid fuel, no water vapor is supplied from the liquid fuel tank 26, and therefore, water generated in the air electrode catalyst layer 13 and water in the polyelectrolyte membrane 1 and so forth generate internal reforming reaction represented by the above formula (1) with methanol, or generates an internal reforming reaction by another reaction mechanism without requiring water, not through the internal reforming reaction by the formula (1).

The proton ($H^+$) generated by the internal reforming reaction conducts through the polyelectrolyte membrane 1 and reaches the air electrode catalyst layer 13. The electron ($e^-$) performs work by load as not shown and then reaches the air electrode catalyst layer 13.

The air taken in from the air inlets 30 of the surface layer 29 diffuses through the moisturizing layer 28, the air electrode conductive layer 18, and the air electrode gas diffusion layer 14, and is supplied to the air electrode catalyst layer 13. The oxygen in the air supplied to the air electrode catalyst layer 13 and the proton ($H^+$) and the electron ($e^-$) reaching the air electrode catalyst layer 13 generate the reaction as shown in the following formula (2) to generate water.

$$(3/2)O_2 + 6H^+ + 6e^- \rightarrow 3H_2O \qquad (2)$$

The water generated in the air electrode catalyst layer 13 by the reaction diffuses through the air electrode gas diffusion layer 14 and reaches the moisturizing layer 28 and some of water is vaporized from the air inlets 30 of the surface layer 29 provided on the moisturizing layer 28, but the residual water is prevented from evaporating by the surface layer 29. In particular, when the reaction of the formula (2) is advanced, the water amount prevented from evaporating by the surface layer 29 increases and the water storage amount in the air electrode catalyst layer 13 increases. In this case, the state becomes that along with the progress of the reaction of the formula (2), the water storage amount in the air electrode catalyst layer 13 is larger than the water storage amount in the fuel electrode catalyst layer 11.

As a result, by an osmotic pressure phenomenon, there is promoted the reaction that the water generated in the air electrode catalyst layer 13 passes through the polyelectrolyte membrane 1 and moves to the fuel electrode catalyst layer 11. Therefore, compared to the case that the moisture supply to the fuel electrode catalyst layer 11 depends on only the water vapor vaporized from the liquid fuel tank 26, the water supply is promoted. The internal reforming reaction of methanol in the above-described formula (1) can be promoted. Thereby, the output density can be enhanced and therewith the high output density can be maintained over a long period.

Also when the methanol aqueous solution whose methanol concentration is more than 50 mol/or pure methanol is used as the liquid fuel, the water moving to the fuel electrode catalyst layer 11 from the air electrode catalyst layer 13 can be used for the internal reforming reaction, and therefore, the water supply to the fuel electrode catalyst layer 11 can be performed stably. Thereby, the reaction resistance of the internal reforming reaction of methanol can be further lowered and long-term output characteristic and load current characteristic can be more improved. Furthermore, downsizing of the liquid fuel tank 26 can be achieved.

Moreover, as described above, the polyelectrolyte material 9 according to the present embodiment can suppress the thermal expansion or expansion due to penetration of water. Therefore, in the fuel cell 10 using the polyelectrolyte material 9 according to the present embodiment, size changes of the polyelectrolyte membrane 1, the fuel electrode catalyst layer 11, and the air electrode catalyst layer 13 can be prevented to suppress troubles such as delamination of the catalyst layer or methanol crossover.

Also, the mechanical strength is high, and therefore, the polyelectrolyte membrane 1 can be thin, and the conduction of proton ($H^+$) becomes easy.

Moreover, in fuel cells in recent years, it is desired to use liquid fuel of high concentration (such as methanol of 50% by weight or more). However, also in this case, there is no danger that the polyelectrolyte material is melted, and output characteristic that is stable for a long time can be obtained.

Next, a method for manufacturing the fuel cell 10 according to an embodiment of the present invention will be explained.

Figure 5:
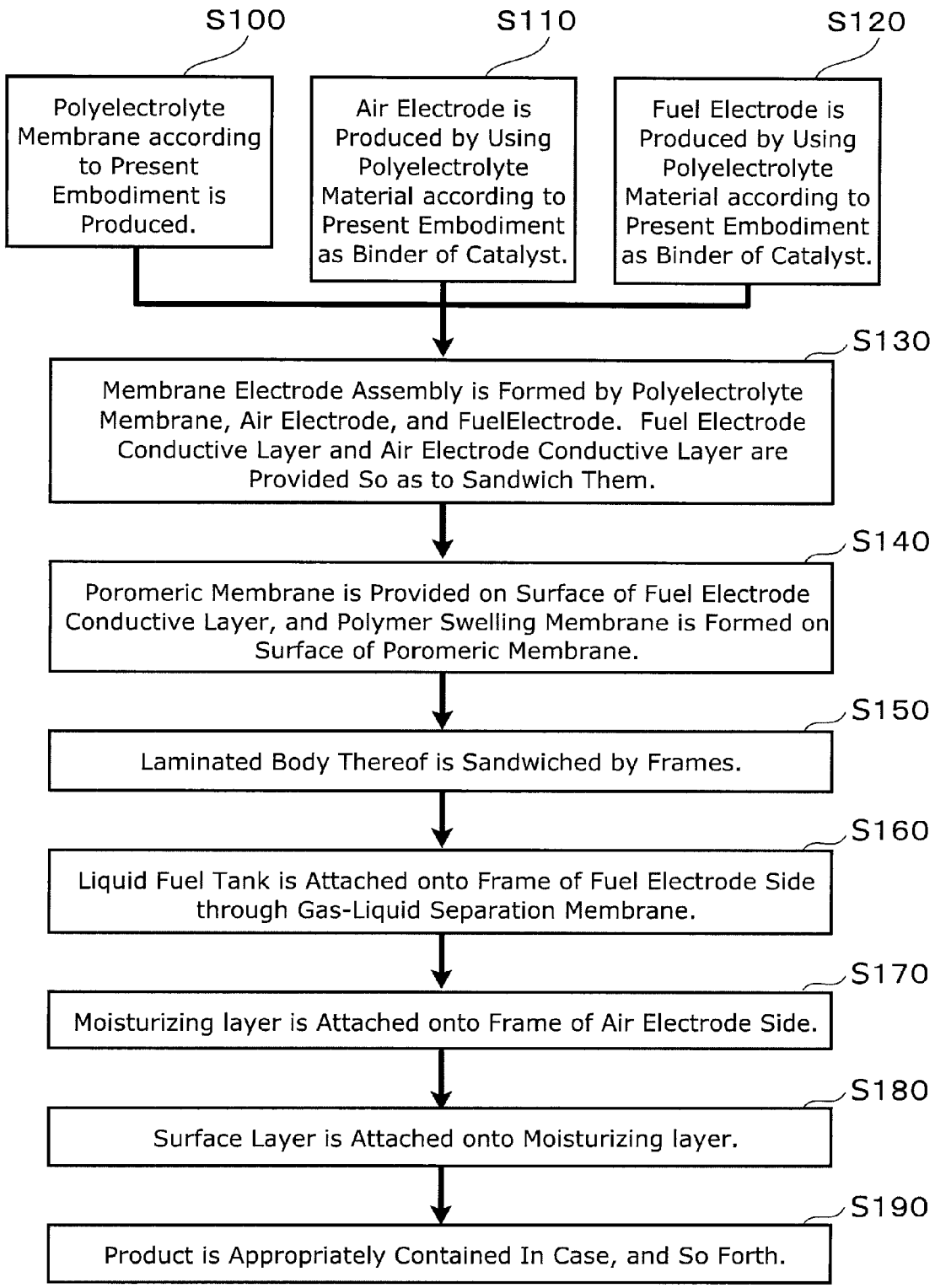
FIG. 5 is a flow chart for the method for manufacturing a fuel cell according to an embodiment of the present invention.

FIG. 5 is a flow chart showing the method for manufacturing a fuel cell according to the present embodiment.

First, the polyelectrolyte membrane 1 according to the present embodiment is manufactured by the above-described method (Step S100). The polyelectrolyte membrane 1 may be a membrane in which a polyelectrolyte material is filled as explained in FIG. 2 or may be a membrane composed of the polyelectrolyte material.

Next, the polyelectrolyte membrane according to the present embodiment (for example, sulfonated polyetherketone) is dissolved in N—N-dimethyl formamide or the like so as to be used as a binder, and mixed with platinum-supporting graphite particles by a homogenizer to produce a slurry, the slurry is applied to a carbon paper that is the air electrode gas diffusion layer 14. And, the slurry is dried at normal temperature and set to be the air electrode catalyst layer 13, and thereby, the air electrode is manufactured (Step S110).

Next, the polyelectrolyte membrane according to the present embodiment (for example, sulfonated polyetherketone) is dissolved in N—N-dimethyl formamide or the like so as to be used as a binder, and mixed with graphite particles supporting platinum-ruthenium alloy fine particles by a homogenizer to produce a slurry. The slurry is applied to a carbon paper that is the fuel electrode gas diffusion layer 12. And, the slurry is dried at normal temperature and set to be the air electrode catalyst layer 11, and thereby, the air electrode is manufactured (Step S120).

At least one of the binder of the catalyst of the air electrode and the binder of the catalyst of the fuel electrode may contain the polyelectrolyte material according to the present embodiment. However, it is preferable that the binder of the catalyst in the fuel electrode contacting the liquid fuel contains the polyelectrolyte material according to the present embodiment.

Next, the membrane electrode assembly 16 is formed by the polyelectrolyte membrane 1, the air electrode (the air electrode catalyst layer 13, the air electrode gas diffusion layer 14 diffusion layer 14), and the fuel electrode (the fuel electrode catalyst layer 11, the fuel electrode gas diffusion layer 12). The fuel electrode conductive layer 17 and the air electrode conductive layer 18 each composed of a gold foil having a plurality of openings for taking in air or vaporized methanol are provided so as to sandwich the membrane and the electrodes (Step S130).

Next, the poromeric membrane 21 composed of polytetrafluoroethylene having hydrophobicity is provided on a surface of the fuel electrode conductive layer 17. Furthermore, methylcellulose dissolved in water is applied onto the surface of the poromeric membrane 21 in the opposite side to the side of the fuel electrode conductive layer 17 at approximately 20 micrometers and dried sufficiently at normal temperature to form the polymer swelling membrane 22 (Step S140).

Next, the laminated body in which the membrane electrode assembly 16, the fuel electrode conductive layer 17, the air electrode conductive layer 18, the poromeric membrane 21, and the polymer swelling membrane 22 are laminated is sandwiched by the two resin flames 23, 24 (Step S150). Between the polyelectrolyte membrane 1 and the fuel electrode conductive layer 17, and between the polyelectrolyte membrane 1 and the air electrode conductive layer 18, O-rings 19, 20 are attached, respectively.

Next, onto the frame 23 of the fuel electrode side, the liquid fuel tank 26 is attached through the gas-liquid separation membrane 25 (Step S160). For the gas-liquid separation membrane 25, for example, a silicone sheet can be used.

Next, the moisturizing layer 28 composed of poromeric material is attached onto the frame 24 of the air electrode side (Step S170).

Next, onto the moisturizing layer 28, the surface layer 29 is attached (Step S180). The surface layer 29 can be, for example, a stainless plate (SUS304) in which air inlets 30 for taking in air are formed.

Finally, the product is appropriately contained in a case and so forth to form the fuel cell 10 (Step S190).

The fuel cell 10 was subjected to endurance test for 500 hours so that pure methanol (95% by weight or more) served as the fuel, and therefore, the output fluctuation was within 10%. This means that the output fluctuation can be reduced at approximately 25%, compared to the case that Nafion (registered trademark) is used as the binder of the polyelectrolyte membrane and the catalyst. Therefore, it was confirmed that output characteristic that is stable for a long time can be obtained. It can be thought that such output characteristic that is stable for a long time is because the delamination of the catalyst and methanol crossover and so forth are suppressed and also the endurance to liquid fuel is high.

As described above, the embodiment of the present invention has been explained with reference to specific examples. However, the present invention is not limited to these specific examples.

As long as having the characteristics of the present invention, the above-described specific example subjected appropriately to design change by those skilled in the art is included in the scope of the present invention.

For example, shape, size, material, disposition, and so forth of each component of the above-described fuel cell are not limited to the exemplified things but can be appropriately modified.

Also, the fuel cell composed of a single membrane electrode assembly is illustrated, but a stuck structure in which a plurality of the membrane electrode assemblies is laminated is possible.

Also, as the fuel, methanol aqueous solution is exemplified and the permeation in the polyelectrolyte membrane has been explained as "methanol crossover". However, the fuel is not limited thereto and the same effect with respect to another liquid fuel can be expected. The another liquid fuel includes, besides methanol, an alcohol such as ethanol and propanol, an ether such as dimethylether, a cycloparaffin such as cyclohexane, a cycloparaffin having a hydrophobic group such as hydroxyl group, carboxyl group, amino group, or amide group. Such a liquid fuel is generally used as an aqueous solution of approximately 5-90% by weight.

Moreover, the components which the above-described respective specific examples have can be combined if at all possible, and the example having combination thereof is included in the scope of the present invention as long as containing the characteristic of the present invention.

The invention claimed is:
1. A fuel cell comprising:
a fuel electrode to which a liquid fuel is supplied;
an air electrode to which an oxidant is supplied; and
a polyelectrolyte membrane provided between the fuel electrode and the air electrode,
the polyelectrolyte membrane including a polyelectrolyte material,
the polyelectrolyte material is a sulfonated polyetherketone including a following structural formula as a structural unit:

(Chemical Formula 1)

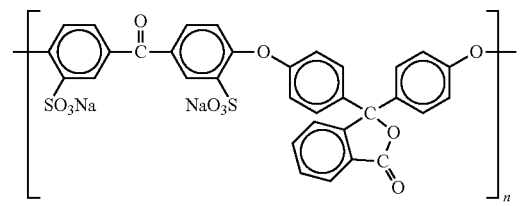

2. The fuel cell according to claim 1, wherein at least one of a binder of a catalyst of the fuel electrode and a binder of a catalyst of the air electrode contains the polyelectrolyte material.

3. The fuel cell according to claim 1, wherein the liquid fuel is methanol whose concentration is 50 percent by weight or more.

4. A method for manufacturing the fuel cell of claim 1, the method comprising: forming the polyelectrolyte membrane by using a solution containing the polyelectrolyte material.

5. The method according to claim 4, wherein at least one of a binder of a catalyst of the fuel electrode and a binder of a catalyst of the air electrode is formed by using a solution containing the polyelectrolyte material.

6. The method according to claim 4, wherein the solution is one of N—N-dimethyl formamide and N-methylpyrolidone.

7. The method according to claim 4, wherein the polyelectrolyte membrane is formed by immersing a poromeric material layer in the solution.

8. The method according to claim 4, wherein the polyelectrolyte membrane is formed by casting method using the solution.

* * * * *